(12) United States Patent
Oxenstierna et al.

(10) Patent No.: US 8,341,645 B1
(45) Date of Patent: Dec. 25, 2012

(54) WORKFLOW AND EXCEPTION SYSTEM

(75) Inventors: David Oxenstierna, Greenwich, CT (US); Denise Sommerville, Marlboro, NJ (US); William Vaughan, Madison, NJ (US); Peter Zope, Brooklyn, NY (US); Alfred Short, Port Chester, NY (US); John Hendy, Berkeley Heights, NJ (US); Raju Patel, Purley (GB); Lawrence Beck, New York, NY (US)

(73) Assignee: Morgan Stanley, New York, NY (US)

( * ) Notice: Subject to any disclaimer, the term of this patent is extended or adjusted under 35 U.S.C. 154(b) by 1211 days.

(21) Appl. No.: 11/805,593

(22) Filed: May 24, 2007

(51) Int. Cl.
  *G06F 11/30* (2006.01)
(52) U.S. Cl. .............. 719/313; 705/35; 705/37
(58) Field of Classification Search .......... None
  See application file for complete search history.

(56) References Cited

U.S. PATENT DOCUMENTS

| | | |
|---|---|---|
| 2005/0216394 A1 | 9/2005 | Monteleone |
| 2005/0222943 A1 | 10/2005 | Monteleone et al. |
| 2005/0234807 A1 | 10/2005 | Toffey |
| 2007/0179833 A1 * | 8/2007 | Moorthy et al. ......... 705/10 |

OTHER PUBLICATIONS

Piyush Maheshware et al., Event-Based Handling in Supply Chain Management using Web Services, 2006, IEEE Computer Society, pp. 2-3.*
Minhong Wang et al., Knowledge-based Exception Handling in Securities Transactions, 2004, IEEE Computer Society, pp. 3-9.*

* cited by examiner

*Primary Examiner* — S. Sough
*Assistant Examiner* — Syed Roni
(74) *Attorney, Agent, or Firm* — K&L Gates LLP

(57) ABSTRACT

An exception management system comprising a centralized exception engine for processing exception messages from a plurality of source systems across a firm (or enterprise) and for generating workflow items where needed from the exception messages. The centralized exception engine may comprise an exception backbone that receives the exception messages from the source systems and processes the exception messages based on business rules. The exception messages may adhere to an exception message definition format. Users may access the exception information via a user interface. The exception engine may send alerts to certain users in certain circumstances based on the business rules. A flow manager of the exception backbone may process the exception messages by: (i) enriching the exception messages with additional information; (ii) prioritizing the exception messages; (iii) routing the exception messages to one or more users; and/or (iv) persisting exception information extracted from the exception messages in a persistent store. A workflow engine may communicate workflow messages to the source systems or directly with the exception backbone when workflow is required for one of the exception messages.

18 Claims, 11 Drawing Sheets

| Component | Sample Rule |
|---|---|
| Enrichment | Add additional attributes to an exception based on an incoming CUSIP data attribute by enriching the exception with data attributes (Issue Type, Country of Issue, Country of Issuer, RIC, SEDOL, ISIN, and Symbol) through lookup to reference data source 54 |
| Expiration | Expire cash fail breaks at end of day as upstream reconciliation process re-generates outstanding exceptions the next day |
| Prioritization | For Agent Bank errors, set to Normal priority when Settlement Date is > today<br>For Trade fails, set to High priority when Settlement Date is today or before and Trade Amount > 3,000,000 for IED products |
| Time Based Publication | Set a 10-minute threshold for Trader Alleged and Sales Unmatched exceptions to allow a 10-minute window for upstream matching of Trader Alleged and Sales Unmatched trades |
| Notification Service | Set a rule to send email notification to exception owners (with pre-defined email format) when current time > Deadline on exception |
| Enterprise Routing Service | Simple rule to leverage attributes such as Role, Division, Exception, Product and Client on the exception to query reference data 22 that returns owner(s)<br>Complex rule involves a series of simple rules based in sequence or parallel |

Fig. 5

| COST CENTRE LEVEL 3 | COST CENTRE LEVEL 4 | COST CENTRE LEVEL 6 | | SWAP BOOK | PRODUCT NUMBER |
|---|---|---|---|---|---|
| CREDIT PROD | CORP CREDIT | LEV CRED LNS | LOANS | ABAI | UMJXS |
| CREDIT PROD | CORP CREDIT | CORP TDG | AAAS | | |
| CREDIT PROD | CORP CREDIT | CORP TDG | ABAI | Exclude | |
| CREDIT PROD | CORP CREDIT | CORP TDG | ABAI | Send | |
| CREDIT PROD | CORP CREDIT | CORP TDG | ABAI | Resolved | |
| CREDIT PROD | CORP CREDIT | CORP TDG | ABAI | Not Responsible | |
| CREDIT PROD | CORP CREDIT | CORP TDG | ABAI | Sign Off | |
| CREDIT PROD | CORP CREDIT | CORP TDG | ABAI | Exclude Group | |
| CREDIT PROD | CORP CREDIT | CORP TDG | ABAI | Update | |
| CREDIT PROD | CORP CREDIT | CORP TDG | ABC: | Pending | |
| CREDIT PROD | CORP CREDIT | CORP TDG | ABAI | Internal Email | |
| CREDIT PROD | CORP CREDIT | LEV CRED LNS | LOAP | Close item(s) | |
| CREDIT PROD | CORP CREDIT | CORP TDG | ABAI | Reapply Coverage | |
| CREDIT PROD | CORP CREDIT | CORP TDG | ABAI | Mark the item(s) WIP | |
| CREDIT PROD | CORP CREDIT | CORP TDG | MMG | Take Ownership | |
| CREDIT PROD | CORP CREDIT | CORP TDG | ABLE | Add Note(s) | |
| | | | | Delegate | |
| | | | | Show Details | |

322

Print
Export To Excel

Fig. 8

WORKFLOW AND EXCEPTION SYSTEM

BACKGROUND

Organizations such as financial services entities often need to track and manage workflow items and process exceptions in order to effectively address items that must be accomplished or items that cause disruptions in the processing and flow of events. For example, a financial services entity may desire to be alerted to any exceptions that happen during securities trading processes. Such exceptions may include failed trades, errors in trade instructions, data errors, etc., and other business events that meet critical thresholds that, if undetected and unaddressed, could seriously disrupt the entity's business.

Also, organizations often track tasks in a process to ensure that the tasks are specified, executed, monitored, and coordinated. As used herein, "workflow" means how task items are structured, who performs them, what their relative order is, how they are prioritized, how information flows to support the tasks, how tasks are being tracked, etc.

Existing source systems and products do not provide workflow items and exceptions directly to "owners" (i.e., those responsible for handling, delegating, responding to, etc. the exception) of the items and exceptions. Also, such existing systems neither have the capacity nor the capability that may be needed to process workflow items and exceptions. Additionally, there are no existing systems that offer a consolidated view of workflow items and exceptions within an organization for the purpose of promoting user efficiency, monitoring, oversight, client service and risk management capabilities including Sarbanes-Oxley Act (SOX) compliance.

SUMMARY

In one general aspect, the present invention is directed to an exception management system comprising a centralized exception engine for processing exception messages from a plurality of source systems across a firm (or enterprise) and for generating workflow items where needed from the exception messages. According to various embodiments, the centralized exception engine comprises an exception backbone that receives the exception messages from the source systems and processes the exception messages based on business rules. The exception messages may be Extensible Markup Language (XML)-based messages and adhere to a standard message definition format. Users may access the exception information via a user interface (e.g., a web-based user interface). Also, the exception engine may send alerts to certain users in certain circumstances based on the business rules.

According to various embodiments, a flow manager of the exception backbone may process the exception messages. Processing the exception messages may include: (i) enriching the exception messages with additional information; (ii) prioritizing the exception messages; (iii) routing the exception messages to one or more users; and/or (iv) persisting exception information extracted from the exception messages in a persistent store.

The exception engine may further comprise a workflow engine in communication with the exception backbone and the source systems. The workflow engine may communicate workflow messages to the source systems when workflow is required for one of the exception messages.

Utilizing a centralized exception engine allows the processing of exceptions to be centrally managed and maintained. Also, using a defined message format allows the backbone to integrate with a variety of different source systems. These and other benefits available from the present invention will be apparent from the description below.

BRIEF DESCRIPTION OF THE FIGURES

Various embodiments of the present invention are described herein by way of example in conjunction with the following figures, wherein:

FIG. 5 illustrates examples of rules that can be used to process exceptions by the system of FIG. 2; and FIGS. 6-11 are examples of screen shots of the user interface of the exception/workflow system according to various embodiments of the present invention.

DESCRIPTION

In one general aspect, the present invention is directed to an exception management and workflow management system that allows users to access a centralized, unified system for exception notification and workflow management. According to various embodiments, users may obtain workflow items and exceptions directly from the unified exception management and workflow management system. In addition, users and/or external systems can define exceptions and publish them into the system so that such exceptions can be properly handled. As used herein, the term "exception" includes any type of task, break, interruption, extraordinary event in processing, etc., such as bad or improper instructions, instruction errors, replication errors, communication breakdowns, data errors, system errors, human errors, etc. that may occur during a process and that may require intervention.

Figure 1:
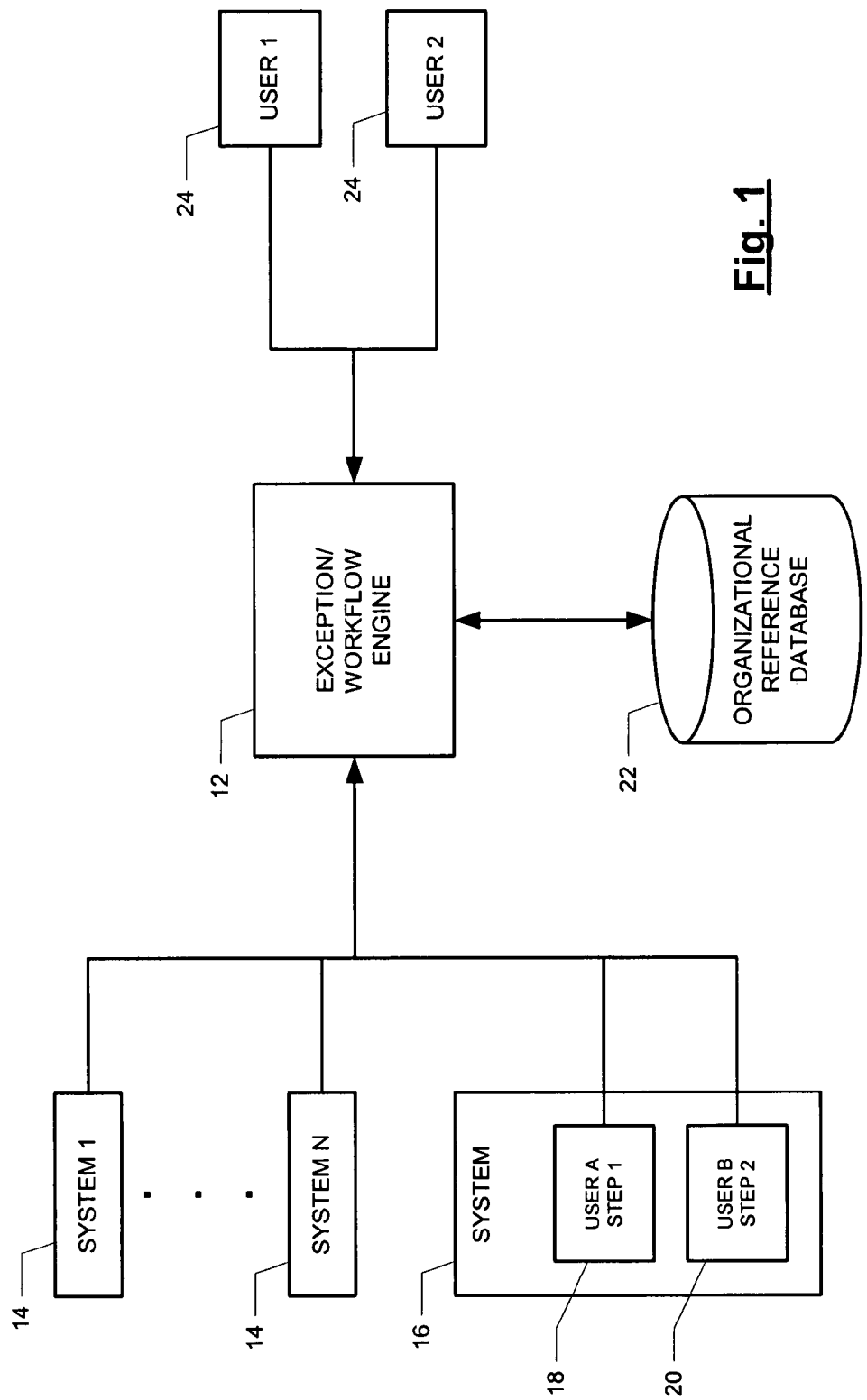
FIG. 1 illustrates an embodiment of a system that includes an exception/workflow system.

FIG. 1 illustrates an embodiment of a system 10 that includes an exception/workflow engine 12. The exception/workflow engine 12 processes workflow tasks and exceptions as described hereinbelow. In various embodiments, the exception/workflow engine 12 provides a single, centralized system for management of exceptions and workflow items. The exception/workflow engine 12 accepts exceptions/work items from source systems 14 and 16 that generate and output exceptions when they are encountered by the systems 14 and 16. In the embodiment illustrated in FIG. 1, the source system 16 is used by two users 18, 20, who each have a step to perform in a particular workflow.

The exception/workflow engine 12 is in communication with an organizational reference data database 22. The database 22 may contain data relating to, for example, coverage and role definitions for various individuals and entities for which exception and workflow information is managed and reported by the exception/workflow engine 12. Users 24 are in communication with the exception/workflow engine 12 via, for example, a network such as a local area network (LAN), wide area network (WAN), wireless network, the Internet, etc. The users 24 are notified of various work items and exceptions that are tracked and reported by the exception/workflow engine 12.

Figure 2:
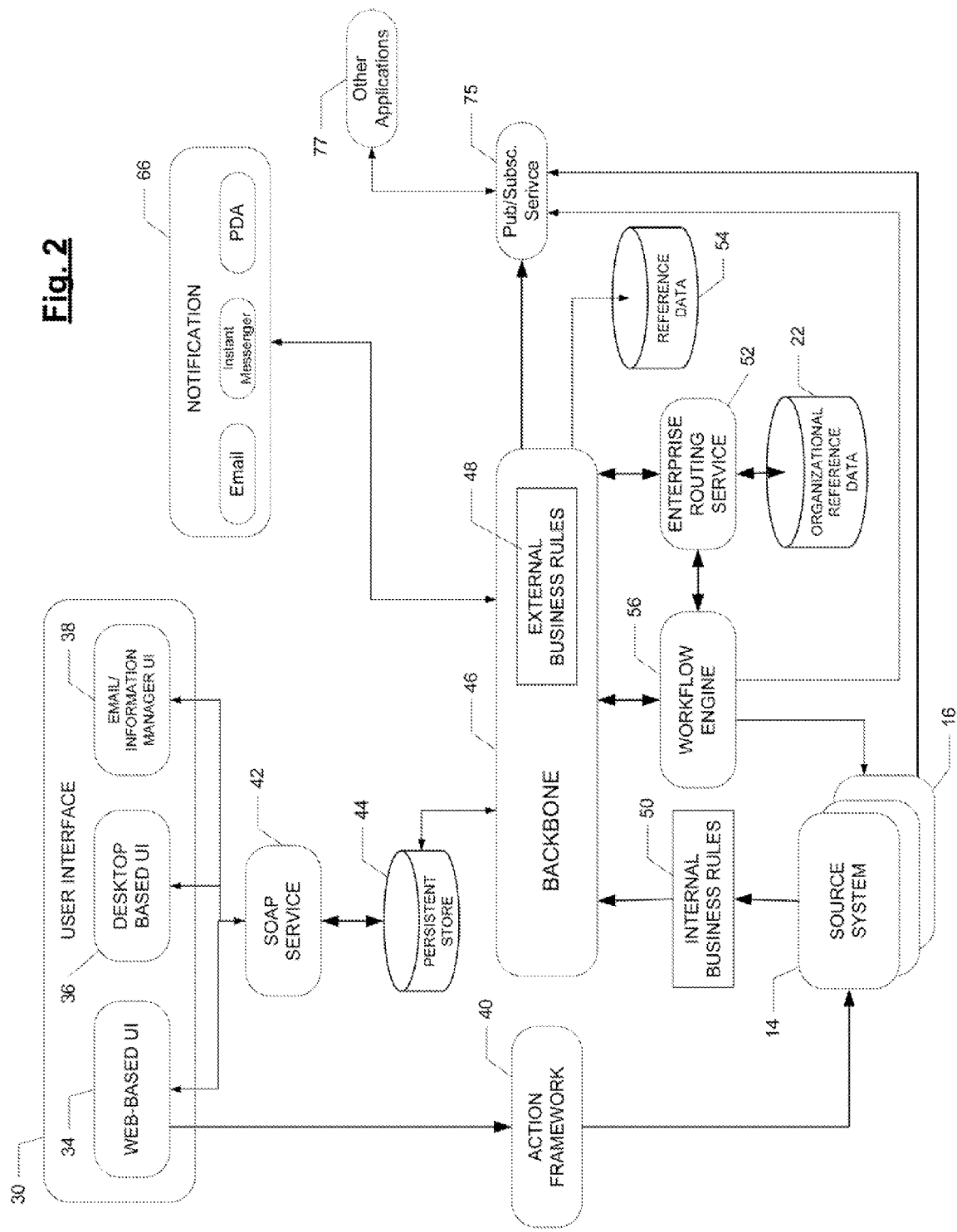
FIG. 2 illustrates an embodiment of the exception/workflow engine of FIG. 1.

FIG. 2 illustrates an embodiment of the exception/workflow engine 12 of FIG. 1. The engine 12 includes a user interface 30 that may be used by the users 24 to access the engine 12. The user interface 30 includes a web-based user interface 34 and a desktop-based user interface 36. The user interface 30 also includes an email/information manager user interface 38 to enable the users 24 to interface with an application such as, for example, Microsoft Outlook. The various components 34, 36 and 38 of the user interface 30 may be accessible by the users 24 using, for example, the Internet. It can be understood that any type of component may be added to the user interface 30 to effectively interface with the exception/workflow engine 12.

An action framework 40 enables interfacing between the user interface 30 and the source systems 14 and 16. The action framework 40 may provide a generic mechanism for describing, presenting and executing actions for an exception. The framework 40 is described herein below in conjunction with FIG. 4. A simple object access protocol (SOAP) service 42 facilitates access by the user interfaces 34, 36 to source systems 16 for the purpose of presenting available actions based on user entitlements. Once a presented action is selected via the user interface 30, the action framework 40 constructs the proper message and communicates with the appropriate source systems 14 and 16 in order for that action to be executed.

Also, as shown in FIG. 2, the exception/workflow engine 12 may comprise a backbone 46, which is described in more detail below in conjunction with FIG. 3. Source systems 14, 16 may communicate with the backbone 46 via queue-based XML message publication. The XML messages may contain relevant information about instances of exceptions. That way, the backbone 46 can be integrated with and service a number of different source systems 14, 16.

The backbone 46 analyzes and processes the incoming exception messages. In that connection, the backbone 46 may apply external business rules 48 and/or internal business rules 50 to enrich the messages with additional information, such as, for example security and account information, from external reference data sources 54. The backbone 46 may also use data from the organizational reference data database 22 via an enterprise routing service 52 to determine to whom exceptions should be routed. Once processing within the backbone 46 is complete, exception information is preferably extracted from the message and stored to the persistent store 44, which is preferably the central database to which all exceptions and their related data are stored and maintained. Using a centralized backbone 46 in such a manner allows for customization of rules across the source systems 14, 16.

If workflow is required for an exception, a workflow engine 56 can interface directly with the exception backbone 46 for stand-alone workflows or interface with the source system 14, 16 and communicate workflow information, including data fields, validation rules, action information and routing information to the backbone 46. The workflow engine 56 may be, for example, a third party vendor product which can handle XML message-based communication with other systems. Such an embodiment adds a layer of abstraction, an interface design that allows two independent systems to interact with each other without the knowledge of the other's existence between the systems and allows other systems to be integrated with the backbone 46 seamlessly. Once exception information is stored to the persistent store 44, it is available to users via the user interface 30. Audit information about each exception may also be stored within the persistent store 44 and available via the user interface 30.

A notification platform 66 enables the backbone 46 to provide alerts about workflow items and exception information to the users 24 based on, for example, business rules. The information may be communicated in, for example, email format, instant messages to user's desktop, and/or a format suitable for a personal digital assistant (PDA) device.

A publication/subscription service 75 in communication with the backbone 46 may also publish the exception messages to other applications 77 as needed for consumption by the other applications.

The backbone 46 may be implemented as one or a number of networked computing devices programmed to process the exception messages as described herein. The action framework may similarly be implemented as one or a number of networked computing devices programmed to describe, present and execute actions for an exception as described herein.

Figure 3:
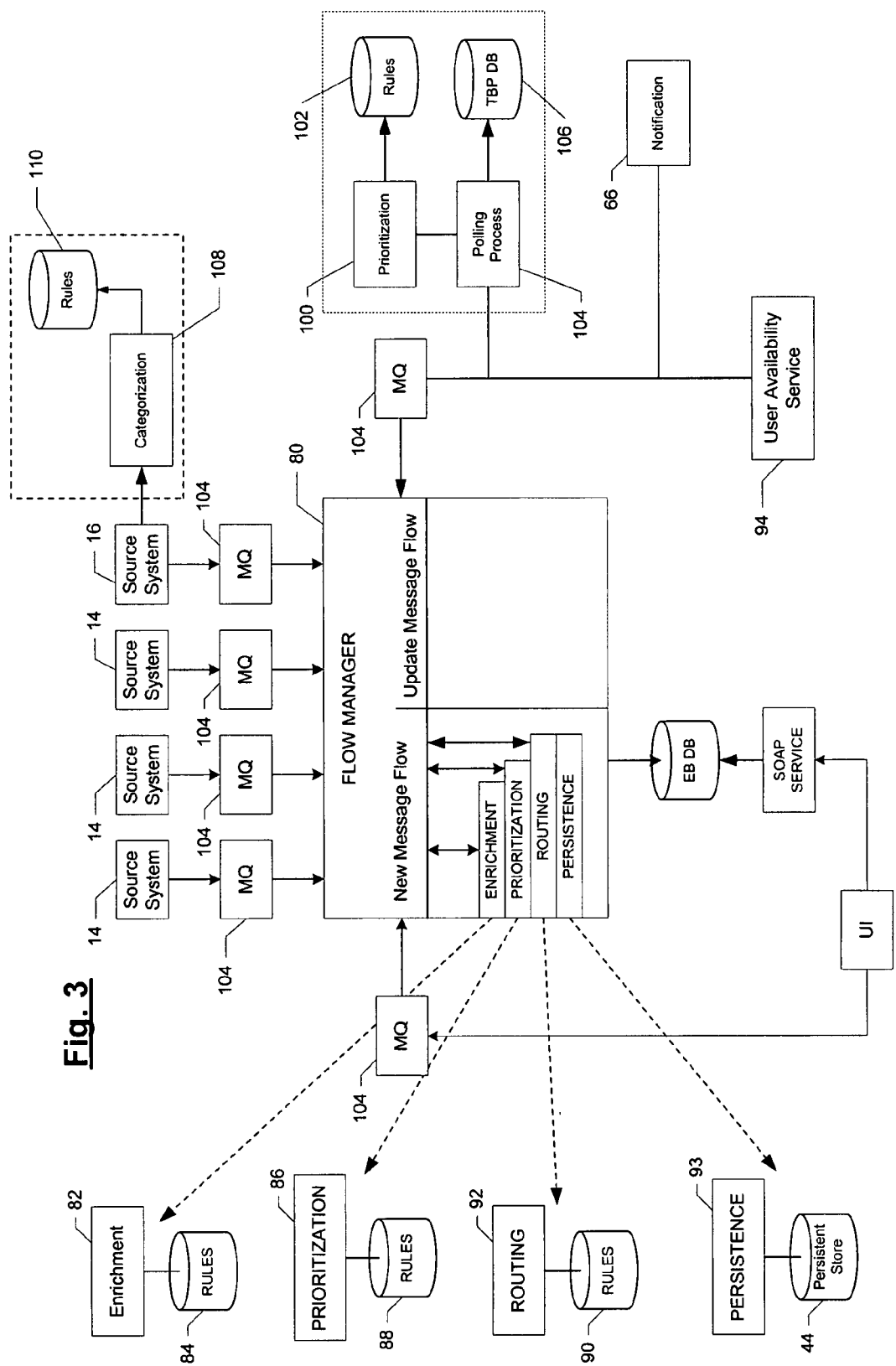
FIG. 3 illustrates an embodiment of the backbone of FIG. 2.

FIG. 3 illustrates an embodiment of the backbone 46 of FIG. 2. A flow manager 80 processes new and updated exception and workflow messages. Processing of an exception message may involve the following: enrichment, prioritization, and routing and persistence. The four components may be independent subprocesses with their own specialized function within the overall exception backbone flow. The flow manager 80 may comprise an enrichment module 82, a prioritization module 86, a routing module 92 and a persistence module 93.

The enrichment module 82 may use enrichment rules from an enrichment rules database 84 to enrich exception messages with additional information, for example, such as security and account information, etc. and to enhance the representation of the exception to the user. For example, account numbers may be enhanced by respective account descriptions. This type of enrichment does not affect how the exception is processed but rather transforms the information into a more meaningful form to the user.

Enrichment may also include, for example, the addition of data that is critical to perform prioritization of exceptions or routing of exceptions. The prioritization module 86 uses prioritization rules from a prioritization rules database 88 to allow for levels of priority to be specified for various exceptions. Examples of priority levels may be "normal priority" and "high priority."

The routing module 92 determines to whom messages should be routed based on routing rules from a routing rules database 90. For example, a routing rule may define that for an instance of an exception of type A which contains an account number equal to X, this exception instance should be directed to User Group I.

The persistence module 93 extracts the relevant exception data from the message based on profile meta-data contained in the database 44 for the given type. The profile meta-data describes which fields in the message to extract for the given exception type and also describes which columns this information should be stored to within the database 44. Once the fields to extract have been identified, the persistence module leverages the meta-data to manage the insertion of this data into the proper columns in the database 44.

The flow manager 80 provides backup coverage functionality via an user availability service 94. An XML message may be published to flow manager 80 which directs exceptions to a backup user(s) in addition to the unavailable user via events published by the user availability service 94. The backup coverage ensures that, when a particular user 24 responsible for an exception or workflow item is not available (e.g., out of the office), the message will get routed to a user 24 who is designated as a backup to the unavailable person in the organizational reference data 22. The user availability service 94 could be some central user availability tracking system, for example, a firm-wide directory, of the users 24.

The flow manager 80 may also provide time-based publication of messages via a prioritization module 100 that utilizes business rules 102 and a polling process module 103 that utilizes data stored in a time-based publication database 106. The time-based publication function allows for messages to be published to users 24 at, for example, a certain time or after the expiration of a certain time because certain items may not be considered an exception until after the expiration of the time period.

Communication to and from various components, within the flow manager 80, and from external source systems 14, 16, may be facilitated by message queues 104. All messaging may be based on a standard XML message format, as mentioned above. The backbone 46 may also include a categorization module 108 that allows for the categorization of exceptions based on criteria set by the rules 110.

The flow manager 80 may be implemented as one or more networked computing devices programmed to process the exception messages as described above. The modules 82, 86, 92, 93 may be embodied as software code to be executed by a processor(s) of the flow manager 80. The software code for the modules may be stored in a computer readable medium.

Figure 4:
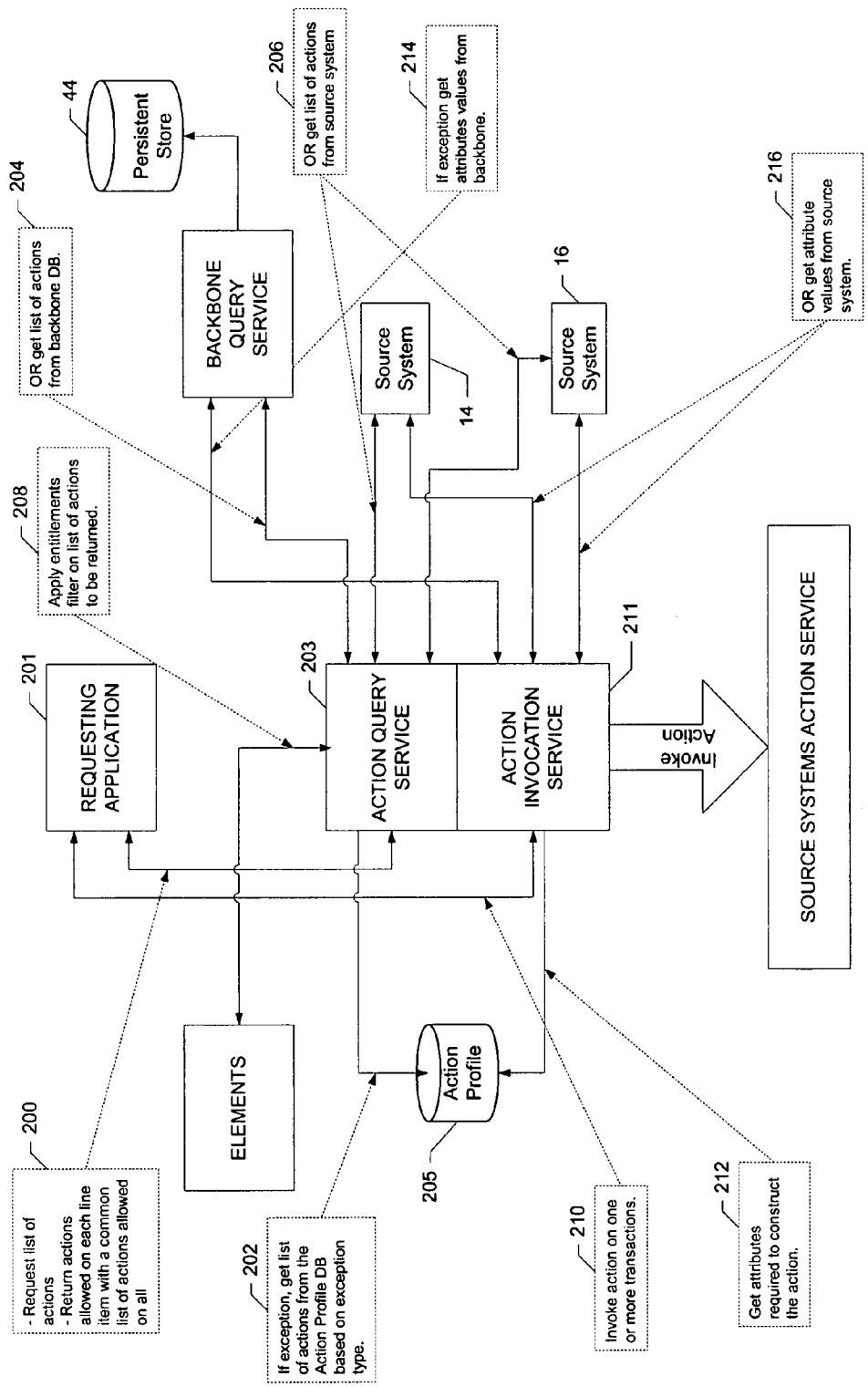
FIG. 4 illustrates an embodiment of a process framework employed by the framework of FIG. 2.
Figure 6:
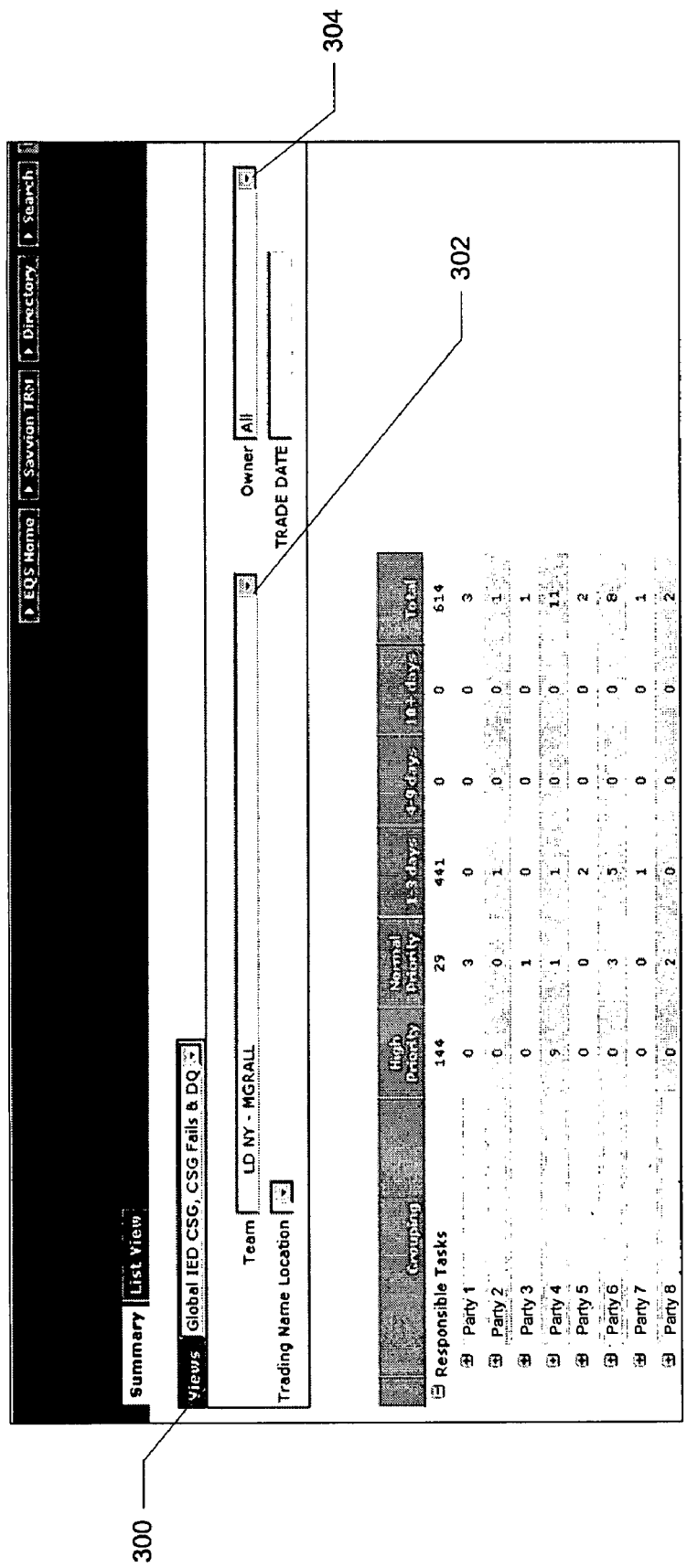

FIG. 4 illustrates an embodiment of a process framework employed by the framework 40 of FIG. 2. At 200, a list of actions is requested by a requesting application 201 and the actions are returned by an action query service 203. At 202, if the action is an exception, a list of actions is obtained from an action profile database 205 based on the type of the exception. Alternatively, at 204, a list of actions may be obtained from the database 44 or, at 206, from a source system.

At 208, an entitlements filter, which displays the subset of entitled actions to the user from a superset of possible actions for the exception, may be applied to the list of actions that is returned to filter. At 210, an action invocation service 211 invokes an action on one or more transactions and at 212, the attributes required to construct the desired action are obtained from the action profile 205. At 214, if the action is an exception, the attribute values are obtained from the backbone 46. Alternatively, at 216 the attribute values can be obtained from the source systems 14 or 16.

FIG. 5 illustrates examples of rules, 48, 50 that can be used to process exceptions by the engine 12 of FIG. 2. The example rules in FIG. 5 are shown in a context of the engine 12 being incorporated in a financial services entity. As shown in the example of FIG. 5, the enrichment rule may enrich the fields of the exception message with data based on the Committee on Uniform Security Identification Procedure CUSIP for a security referenced in the message. A CUSIP is a unique nine-digit identification number for identifying securities. The data may be stored in a products reference data source (not shown) and may include such data as: issue type (stock, bond, etc.), country of issue, country of issuer, issuer, etc.

In the illustrated example, the prioritization rule sets the priority to normal when the settlement date for a securities-related transaction is later than the current day. The prioritization is set for high when the settlement date is the current day or sooner. The routing rules identify the logic to be applied to the messages depending on the division to which they pertain (e.g., fixed income, equity, etc.)

FIGS. 6 through 11 shows example web-based user interface screen shots that may be presented to users 24 via the web-based UI 34 according to various embodiments of the present invention. The summary screen, shown in FIG. 6, may display all of the exceptions to which a particular user 24 has access based on the user's credentials. Some user groups may define multiple summary screen views. To display a different summary screen view, the user can select a desired view using a drop-down window 300. From the summary screen view, the user may also be able to filter exception types, for example, by team (using drop-down window 302), by owner (using drop-down window 304), and/or other filters defined for particular user groups.

Figure 7:
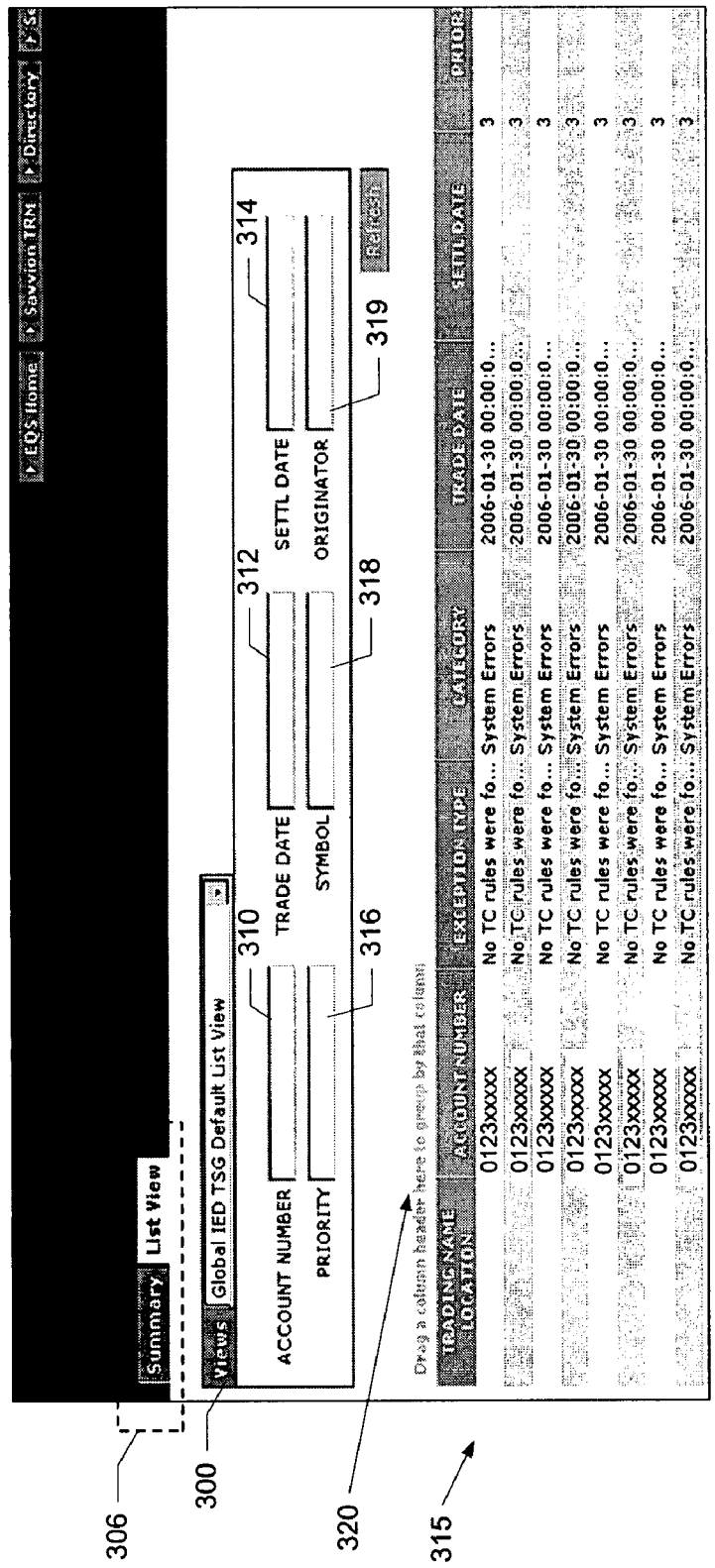
Figure 9:
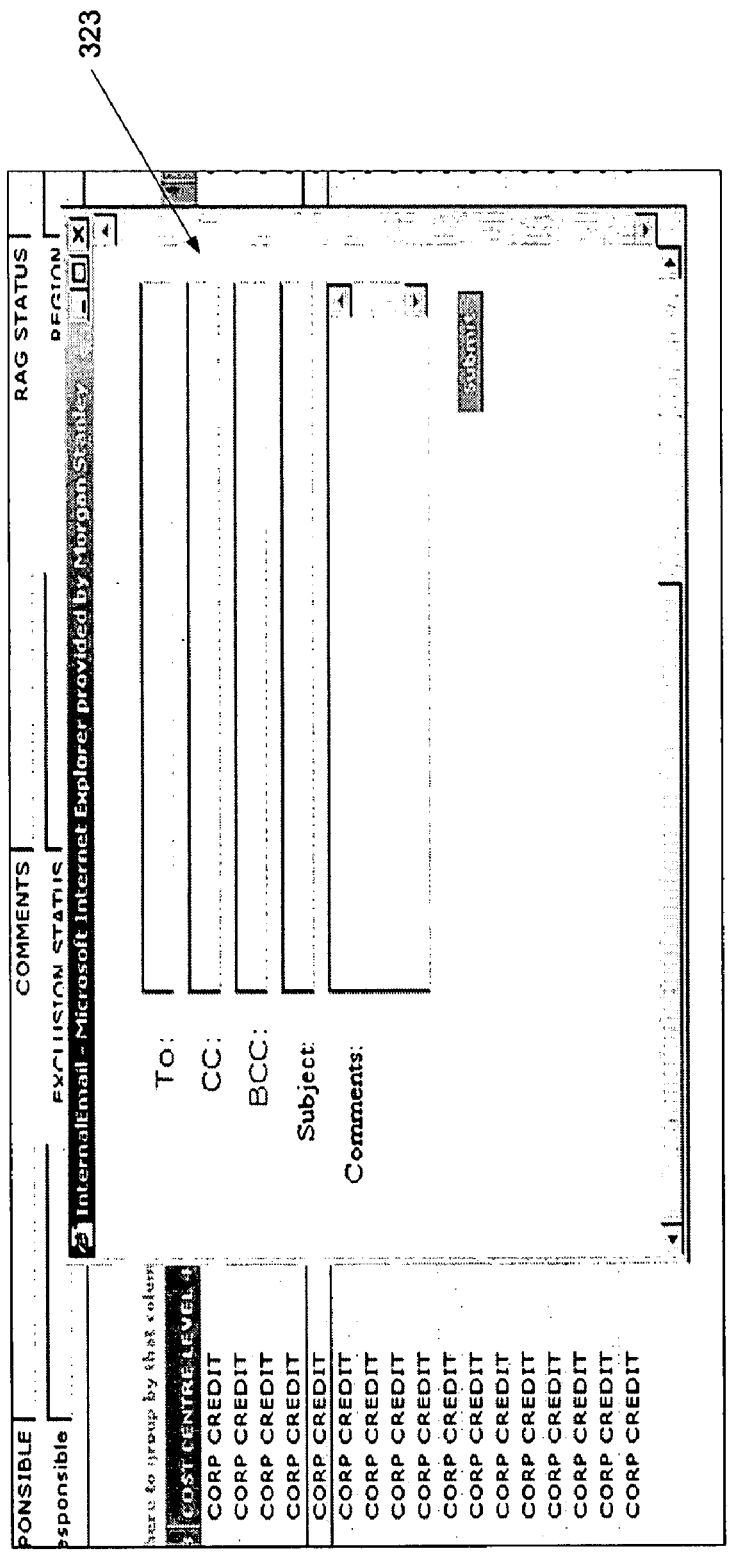

FIG. 7 shows an example of a list view screen. The list view screen may be selected using the tab menu 306 or by clicking a hyperlinked number in the summary screen (see FIG. 6). The list view screen, as shown in FIG. 7, may display details of the tasks in a list view 315. The user may select various list views using the drop-down window 300. Also, the user may be able to filter tasks, for example, by account number (using input field 310), by trade date (using input field 312), by settlement date (using input field 314), by priority (using input field 316), by trading symbol (using input field 318), by origination (using input field 319), and/or other filters.

In various embodiments, a user may be able, via the user interface 30, to group data in the list view 315 into unique categories by, for example, dragging a column(s) from the list to the area 320 above the list view 315.

In addition, as shown in FIG. 8, a user may be able to view available actions with respect to one or more tasks in the task view 315 by right clicking on the selected tasks. The available actions for the task(s) may appear in the window 322. The source feed actions, as shown in FIG. 8, may include exclude, send, resolved, not responsible, sign off, exclude group, update, and pending. The internal e-mail action may allow the user to send an internal e-mail to anyone with the user's enterprise (or firm). The e-mail template 323 shown in FIG. 9 may appear when the user selects the email action from the action window list 322.

According to various embodiments, the "close item(s)" action may remove the item from the task view 315. The "Reapply Coverage" action item exception/workflow engine 12 may make a call to the organizational reference data 22 to determine the coverage for the item and update the item to ensure coverage is correctly applied. The "Mark the Item(s) WIP" action may change the status of the item(s) from new to WIP. Using the "Take Ownership" action, the user may assign an item to his/herself as the sole owner of the item. This action may remove the time from appearing the task view for other users listed as responsible or interested, however, the item may continue to appear when filtering all items for the user's team.

Figure 10:
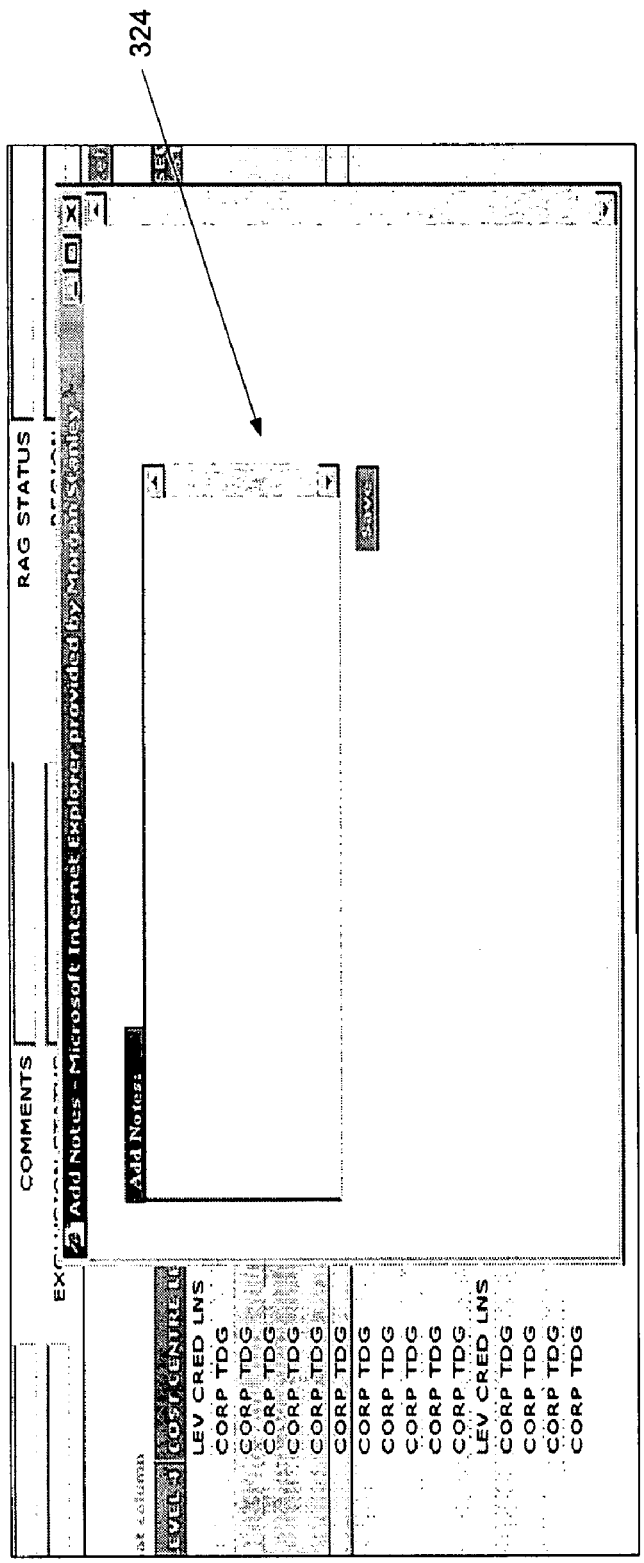

The "Add Note(s)" action may provide the user the ability to add a note(s) to a task(s). The note(s) may be maintained in the audit trail for the item. FIG. 10 provides an example of the screen that may appear when the user chooses the add note action. The user may add the note in free text in the field 324.

Figure 11:
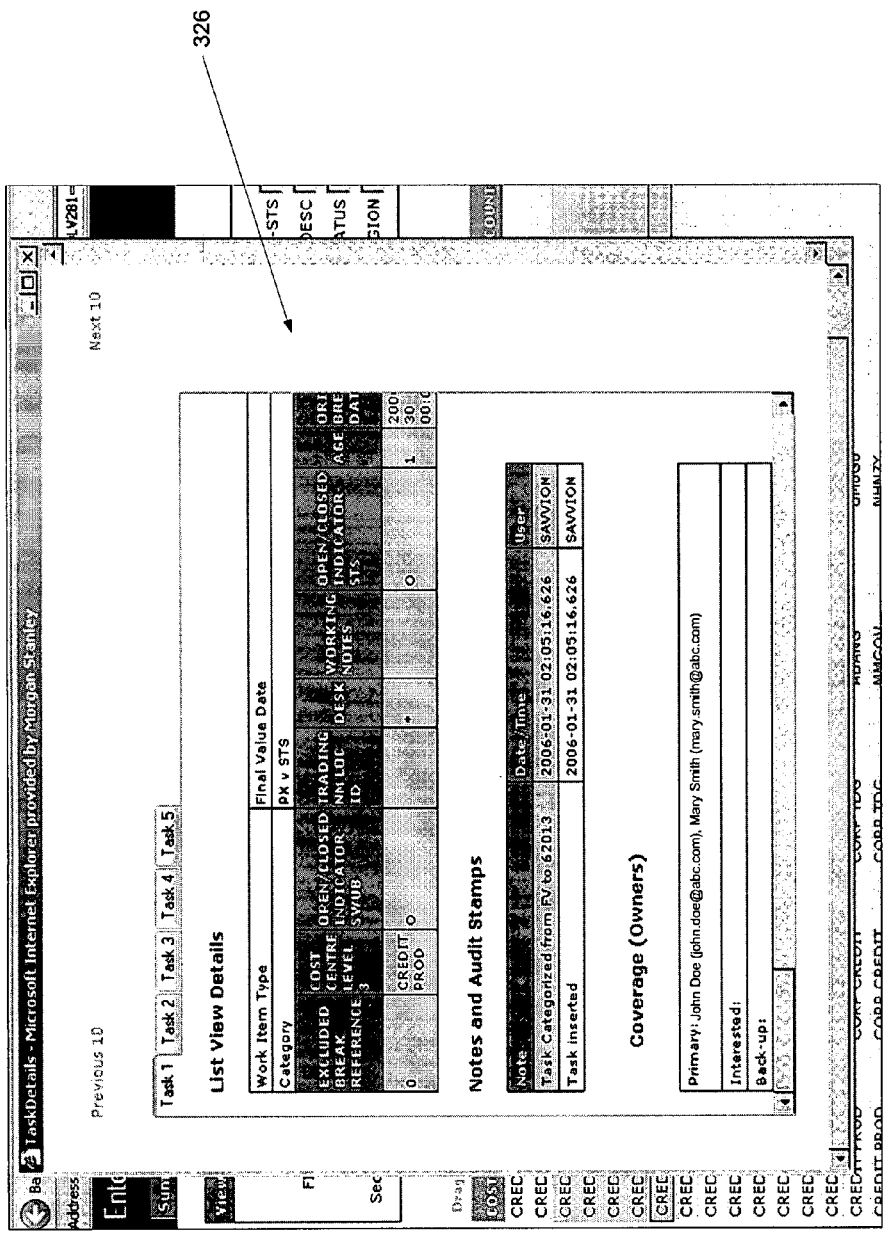

Referring back to FIG. 8, the "Delegate" action may allow the user to assign a task to another member of the user's team or to another team if applicable. The "Show Details" action displays additional details for the selected task(s), as shown in the additional details view 326 in the example of FIG. 11. The additional details may include, as shown in the example of FIG. 11, the audit trail, the owners of the items, and/or any additional fields set by the source feed not shown in the list view 315.

It is to be understood that the figures and descriptions of embodiments of the present invention have been simplified to illustrate elements that are relevant for a clear understanding of the present invention, while eliminating, for purposes of clarity, other elements. Those of ordinary skill in the art will recognize, however, that these and other elements may be desirable for practice of various aspects of the present embodiments. However, because such elements are well known in the art, and because they do not facilitate a better understanding of the present invention, a discussion of such elements is not provided herein. It can be appreciated that, in some embodiments of the present methods and systems disclosed herein, a single component can be replaced by multiple components, and multiple components replaced by a single component, to perform a given function or functions. Except where such substitution would not be operative to practice the present methods and systems, such substitution is within the scope of the present invention. Examples presented herein, including operational examples, are intended to illustrate potential implementations of the present method and system embodiments. It can be appreciated that such examples are intended primarily for purposes of illustration. No particular aspect or aspects of the example method, product, computer-readable media, and/or system embodiments described herein are intended to limit the scope of the present invention.

It should be appreciated that figures presented herein are intended for illustrative purposes and are not intended as construction drawings. Omitted details and modifications or alternative embodiments are within the purview of persons of ordinary skill in the art. Furthermore, whereas particular embodiments of the invention have been described herein for the purpose of illustrating the invention and not for the purpose of limiting the same, it will be appreciated by those of ordinary skill in the art that numerous variations of the details, materials and arrangement of parts/elements/steps/functions may be made within the principle and scope of the invention without departing from the invention as described in the appended claims.

What is claimed is:

1. A computer-implemented exception management system for managing exception workflow of business processes involving financial securities-related transactions performed by a financial services organization that processes securities-related transactions, the exception management system comprising:

an organizational reference database that stores data comprising coverage and role data for the financial services organization;

a centralized exception engine, comprising one or more computers, in communication with the organizational reference database and a plurality of source systems for the financial services organization, wherein each of the plurality of source systems is associated with one or more business processes of the financial services organization, and wherein the centralized exception engine is programmed to:

enrich an incoming exception message initiated from one of the plurality of source systems for a securities-related transaction that generated an exception with data attributes based on one or more business rules to enhance a representation of the exception message, wherein the data attributes are stored in at least one reference database separate from the source systems that generate the exceptions, the data attributes including at least a security involved in the securities-related transaction, an account associated with the securities-related transaction, and prioritization data for the exception message that indicates a level of priority for processing the exception message;

prioritize the exception message based on at least one prioritization rule and the prioritization data;

route the exception message to one or more users associated with the financial services organization for processing of the exception, wherein the exception message is routed to the one or more users based on at least:

the coverage and role data for the financial services organization stored in the organizational reference database;
            an exception type for the exception;
            the security involved in the transaction; and
            the account associated with the transaction;

provide the one or more users with one or more entitled actions selectable by the one or more users to process the exception, wherein the one or more entitled actions are determined based on entitlements of the one or more users; and persist exception information extracted from the exception messages in a persistent store.

2. The exception management system of claim 1, wherein the exception messages adhere to an exception message definition format.

3. The exception management system of claim 2, wherein the centralized exception engine comprises an exception backbone that extracts exception information for the persistent store based on profile meta-data stored in a database.

4. The exception management system of claim 1, wherein the exception messages comprise Extensible Markup Language (XML)-based messages.

5. The exception management system of claim 1, wherein the centralized exception engine further comprises a workflow engine in communication with an exception backbone and the source systems that communicates workflow messages to one or more of the source systems or the exception backbone when workflow is required for one of the exception messages.

6. The exception management system of claim 5, wherein the workflow messages comprise Extensible Markup Language (XML)-based messages.

7. The exception management system of claim 5, further comprising at least one user interface for allowing the one or more users to access information for an exception message.

8. The exception management system of claim 7, wherein the at least one user interface comprises a web-based user interface.

9. The exception management system of claim 7, wherein the at least one user interface comprises a desktop-based user interface.

10. The exception management system of claim 7, wherein the centralized exception engine further comprises a notification platform in communication with the exception backbone that provides an alert regarding an exception to one or more users based on the one or more business rules.

11. The exception management system of claim 1, wherein the centralized exception engine comprises a flow manager for processing the exception messages.

12. A computer-implemented method for managing exception workflow of business processes involving financial securities-related transactions performed by a financial services organization that processes securities-related transactions, the method comprising:

storing, in an organizational reference database, data comprising coverage and role data for the financial services organization;

receiving at a centralized exception engine an exception message from at least one of a plurality of source systems in communication with the exception engine, wherein the exception message is generated and output by the at least one source system when the source system encounters an exception in processing a securities-related transaction;

enriching, by the centralized exception engine, the received exception message with data attributes based on one or more business rules to enhance a representation of the exception message, wherein the data attribute are stored in at least one reference database separate from the source systems that generate the exceptions, the data attributes including at least a security involved in the securities-related transaction, and an account associated with the securities-related transaction, and prioritization data for the exception message that indicates a level of priority for processing the exception message;

prioritizing the exception message based on at least one prioritization rule and the prioritization data;

routing, by the centralized exception engine, the exception message to one or more users associated with the financial services organization for processing the exception, wherein the exception message is routed to the one or more users based on at least;
- the coverage and role data for the financial services organization stored in the organizational reference database;
- an exception type for the exception;
- the security involved in the transaction; and
- the account associated with the transaction;

proving the one or more users with one or more entitled actions selectable by the one or more users to process the exception, wherein the one or more entitled action are determined based on entitlements of the one or more users; and persisting exception information extracted from the exception messages in a persistent store.

13. The method of claim 12, wherein the exception messages from the plurality of source systems received by the exception engine adhere to an exception message definition format.

14. The method of claim 12, wherein persisting exception information comprises extracting the exception information for the persistent store based on profile meta-data stored in a database.

15. The method of claim 12, wherein the exception messages comprise Extensible Markup Language (XML)-based messages.

16. The method of claim 12, further comprising communicating a workflow message to one or more source systems from a workflow engine of the exception engine when workflow is required by the exception message.

17. The method of claim 16, wherein the workflow message comprises an Extensible Markup Language (XML)-based message.

18. The method of claim 12, further comprising providing an alert regarding the exception to one or more users based on the at least one business rule.

\* \* \* \* \*